(12) United States Patent
Cinquin

(10) Patent No.: US 10,596,771 B2
(45) Date of Patent: Mar. 24, 2020

(54) PROCESS AND INSTALLATION FOR PRODUCING A COMPOSITE MATERIAL PART

(71) Applicant: AIRBUS SAS, Blagnac (FR)

(72) Inventor: Jacques Cinquin, Igny (FR)

(73) Assignee: AIRBUS SAS, Blagnac (FR)

( * ) Notice: Subject to any disclaimer, the term of this patent is extended or adjusted under 35 U.S.C. 154(b) by 72 days.

(21) Appl. No.: 15/300,388

(22) PCT Filed: Apr. 2, 2015

(86) PCT No.: PCT/EP2015/057309
§ 371 (c)(1),
(2) Date: Sep. 29, 2016

(87) PCT Pub. No.: WO2015/150515
PCT Pub. Date: Oct. 8, 2015

(65) Prior Publication Data
US 2017/0129194 A1 May 11, 2017

(30) Foreign Application Priority Data
Apr. 3, 2014 (FR) ...................... 14 52946

(51) Int. Cl.
*B29C 70/40* (2006.01)
*B29C 70/44* (2006.01)
*B29C 70/54* (2006.01)
*B29C 35/02* (2006.01)
*B29C 33/02* (2006.01)
(Continued)

(52) U.S. Cl.
CPC ........ *B29C 70/443* (2013.01); *B29C 35/0272* (2013.01); *B29C 35/0288* (2013.01); *B29C 70/40* (2013.01); *B29C 70/54* (2013.01); *B29C 2033/023* (2013.01);
(Continued)

(58) Field of Classification Search
CPC .............. B29C 70/443; B29C 35/0272; B29C 35/0288; B29C 70/40; B29C 70/54; B29C 2033/023; B29C 2035/0211; B29K 2105/0845; B29L 2009/00
See application file for complete search history.

(56) References Cited

U.S. PATENT DOCUMENTS 6,146,576 A   11/2000  Blackmore

FOREIGN PATENT DOCUMENTS

| EP | 2511080 | 10/2012 |
|---|---|---|
| JP | 56067217 | 6/1981 |
| JP | 60044328 | 3/1985 |

OTHER PUBLICATIONS

International Search Report, International Application No. PCT/EP2015/057309, dated Jul. 1, 2015.

*Primary Examiner* — George R Koch
(74) *Attorney, Agent, or Firm* — Greer, Burns & Crain, Ltd.

(57) ABSTRACT

A process and installation for producing a composite material part in which plies of continuous and electrically conductive fibers are deposited to form a stack of plies on a substrate. At least the face of the substrate bearing the stack is electrically insulating and the following steps are carried out a) an electrical terminal is inserted between the ends of at least two plies placed directly one on top of the other in the stack, and on at least two opposite sides of these plies b) when the fibers are dry, introducing a resin in order to impregnate the fibers and c) making a current flow between the electrical terminals through the plies in order to set the resin by resistive heating.

8 Claims, 1 Drawing Sheet

(51) Int. Cl.
*B29K 105/08* (2006.01)
*B29L 9/00* (2006.01)
(52) U.S. Cl.
CPC ................ *B29C 2035/0211* (2013.01); *B29K 2105/0845* (2013.01); *B29L 2009/00* (2013.01)

PROCESS AND INSTALLATION FOR PRODUCING A COMPOSITE MATERIAL PART

CROSS-REFERENCE TO RELATED APPLICATIONS

This application is the National Stage of International Application No. PCT/EP2015/057309, having an International Filing Date of 2 Apr. 2015, which designated the United States of America, and which International Application was published under PCT Article 21(2) as WO Publication No. 2015/150515 A1, and which claims priority from, and the benefit of, French Application No. 1452946, filed on 3 Apr. 2014, the disclosures of which are incorporated herein by reference in their entireties.

BACKGROUND

1. Field

The presently disclosed embodiment relates to a process for producing parts made of composite materials with fibrous reinforcements.

It furthermore relates to an installation for implementing this method.

2. Brief Description of Related Developments

The technical advantages of composite materials have resulted in a growth in their distribution in the most wide-ranging technological fields, and they are becoming increasingly important in sectors such as the aeronautic, space or automotive sectors.

Purely by way of illustration, in the aeronautic field, structural elements of aircraft are produced from composite material in order to reduce the onboard mass.

Typically, the parts produced from composite material comprise a resin matrix reinforced by fibers. These parts are generally obtained by stacking on a tool layers of fibers pre-impregnated with resin. After the layers of fibers are deposited, the assembly is covered with, among other items, a bladder and then introduced into an autoclave and subjected to a cycle of temperature and pressure so as to achieve the polymerization of the part.

During these polymerization steps, the temperatures are generally in the order of 200° C. for conventional parts and can reach 350° C. for high-temperature application materials such as polyimides.

However, it is observed that a high amount of energy is necessary to heat the tools, often made of metal, and the volume of the oven or autoclave used, having serious financial repercussions from the point of view of energy consumption.

Moreover, by virtue of the high quantities of energy required and the high thermal inertia of the means used, heating speeds are often limited to less than 1° C./minute.

Now, since production rates are becoming faster, the means traditionally used will quickly be limited, except for multiplying in number and consequently substantially increasing the manufacturing costs, which is contradictory to the economic interests of manufacturing companies.

Ionization polymerization processes represent an interesting alternative since they provide for polymerization and/or cross-linking without a temperature rise.

Thus, it is possible to obtain good-quality composite materials in a relatively short time and using relatively low amounts of energy.

However, no industrial outcome has come about to this day.

Therefore, an urgent need exists for a process for the hardening of thermoset matrix composite parts or for the temperature consolidation of thermoplastic matrix composite parts, which is low-cost while allowing substantially faster production rates.

The presently disclosed embodiment aims to overcome these various drawbacks of the prior art by proposing a process and an installation for producing composite material parts, which are simple in their design and mode of operation, low-cost and provide for limiting the thermal energy consumed for the same polymerization efficiency.

SUMMARY

To this end, the disclosed embodiment relates to a process for producing a composite material part, in which plies of continuous and electrically conducting fibers are deposited to form a stack of plies on a support.

According to the disclosed embodiment, with at least the face of said support bearing said stack being electrically insulating, the following steps are carried out:
 a) introducing an electrical terminal between the ends of at least two plies placed one directly above the other in said stack, and on at least two opposite sides of these plies,
 b) when said fibers are dry, introducing a resin to impregnate said fibers,
 c) making a current flow between said electrical terminals through said plies in order to harden said resin by Joule heating or to bring said resin to the liquid state by Joule heating with a view to consolidating said resin.

Since the fibers are continuous and electrically conducting, by placing terminals on at least two opposite sides of the stack, an electrical circuit is established by means of said fibers.

Terminals can thus be deposited between all the plies or between two or three, or more, plies depending on the polymerization conditions of the stack.

Of course, a person skilled in the art will understand that step b) is purely optional since a stack of pre-impregnated fibers can be used.

Preferably, the support is electrically insulating or at least the face of this support receiving said stack is electrically insulating.

The composite materials to which the process of the presently disclosed embodiment applies are materials formed by a resin and by a fibrous reinforcement intended to confer particular properties to these materials. In particular, these composite materials are formed by a fibrous reinforcement being presented in the form of plies and which provides the strength and rigidity of the parts, and by an organic matrix providing the bonding between the plies of fibers. The continuous and electrically conducting fibers are in general made of carbon.

Advantageously, the present process for producing a composite material part allows the production of composite parts that are similar to the traditionally consolidated or polymerized parts but with a better controlled energy cost and faster production rates.

It finds applications in fields using composite parts such as space, aeronautics, automotive, nautical, etc.

In various particular aspects of this process, each having its particular advantages and open to numerous possible technical combinations:

since said stack exhibits a longer dimension along at least one of the longitudinal and transverse axes of said part, the hardened assembly obtained at step c) is cut out according to the measurements of the part to be produced.

The assembly obtained is thus cut out to the final dimensions of the part to be produced. Advantageously, the assembly obtained can be cut out in line with the ends of each terminal placed in said assembly.

at step a), at least said electrical terminals between the ends of two plies placed one directly above the other are introduced at the center of said stack in order to heat this stack at the core, at least some of said plies of the stack are deposited such that the fibers of these plies exhibit different orientations relative to a main axis of this stack.

By having different orientations of fibers, a better distribution of the heat in the stack is thus obtained.

Purely by way of illustration, since each ply is formed by unidirectional fibers, a first ply exhibits an angle of inclination of 0° relative to the longitudinal axis of the stack, the ply immediately placed on top of this first fly exhibits an angle of inclination of 45° relative to this longitudinal axis while a third ply placed directly above the second ply exhibits an angle of inclination of 90° relative to said longitudinal axis.

at least one temperature sensor is introduced in said stack or at least one temperature sensor is placed on the outer surface of said stack and the electrical power is controlled as a function of a required temperature profile, at step b), said plies are impregnated with a thermoset or thermoplastic resin.

The impregnation of said resin is performed by vacuum means.

said plies of fibers are plies of unidirectional fibers or woven plies, i.e. exhibiting two orientations of fibers at 90° in the same ply.

The presently disclosed embodiment also relates to an installation for implementing the process for manufacturing a composite material part as described previously.

According to the disclosed embodiment, this installation comprises:

a mold, for which at least the surface intended to support said stack is electrically insulating,
at least two electrical terminals,
an electrical power source, and
a power supply circuit to connect said electrical terminals to said source.

Of course, when it is necessary to introduce a thermoset or thermoplastic resin to impregnate the plies of the stack before step c), this installation includes an injection device.

The temperature of this injection device can be controlled in order to preserve the material to be injected in the mold, remaining in the device after injection, at a temperature preventing its polymerization.

In various particular aspects of this installation, each having its particular advantages and open to numerous possible technical combinations:

said electrical terminals are metal wires or foils,
this installation comprises a pressing means to exert pressure on said stack during the polymerization phase.

This pressing means has the effect of causing a contraction aiming to expel air trapped between the plies and around the fibers during the polymerization step. Thus, the porosity is reduced, and air and solvents are expelled during this polymerisation step.

said mold is produced from an electrically insulating material such as a composite material based on glass fibers or on treated wood or on any other non-electrically-conducting material.

This mold can include a fixed half-mold, the outer surface of which is intended to bear said stack, and a sealing bladder intended to cover at least the stack with a view to its polymerisation.

this installation comprises one or more temperature sensors connected to the control unit to control the electrical power delivered by said electrical power supply source as a function of a required temperature profile.

BRIEF DESCRIPTION OF THE DRAWINGS

Other particular advantages, aims and features of the presently disclosed embodiment will emerge from the following description given, with an explanatory aim and one which is not at all limiting, with reference to the accompanying drawings, in which.

DETAILED DESCRIPTION

First of all, it is noted that the drawings are not to scale.

Figure 1:
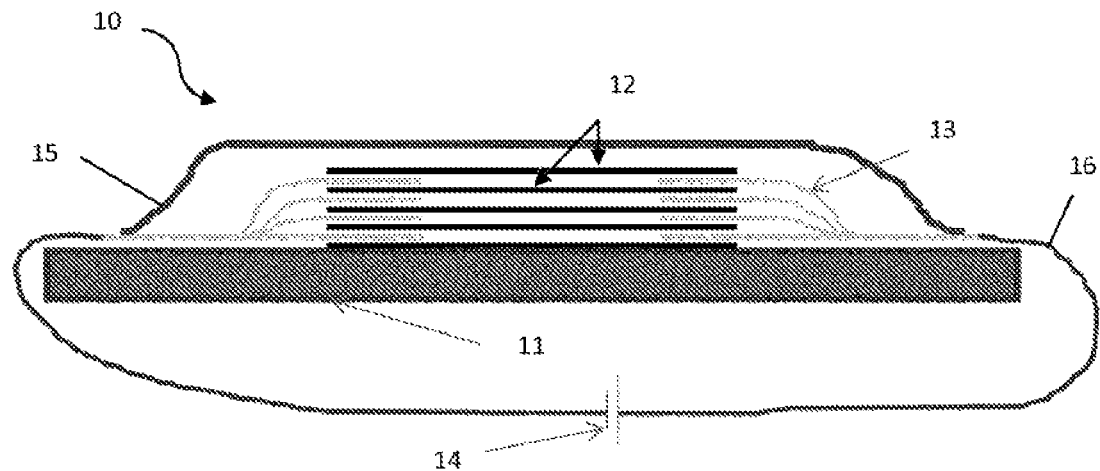
FIG. 1 schematically represents a cross-sectional view and a face view of an installation for producing a composite material part according to a particular aspect of the presently disclosed embodiment.

FIG. 1 schematically represents a cross-sectional view and a face view of an installation 10 for producing a composite material part according to a particular aspect of the presently disclosed embodiment.

This part is produced here by stacking on a flat-shaped half-mold 11 plies 12 of fibers pre-impregnated with resin. Of course, this tool 11 could exhibit a shape that is not flat, such as a convex shape, depending on the final shape to be conferred to said part. This half-mold 11 is in this case produced from an electrically insulating material such as a glass-fiber-based composite material.

Each ply 12 is in this case formed by unidirectional fibers that are continuous and electrically conducting, such as carbon fibers, these plies being deposited for example using a drape-forming machine (not represented).

Placed between two successive plies 12 of the stack thus produced are two metal foils 13 arranged on two opposite sides of the plies 12 and tangentially, or substantially tangentially, to the direction defined by the orientation of the unidirectional fibers of these plies.

These metal foils 13, which are connected to an electrical power supply circuit supplied by a current source 14, define electrical terminals through which an electrical current is introduced in the part to be polymerized by means of the fibers of the plies electrically connecting said terminals 13 from one edge to the other of the stack. These metal foils 13 are, for example, rectangular-shaped copper-plates.

Although conventionally the number of plies 12 deposited is dependent on the thickness of the part to be produced while taking into account a coefficient of reduction of the thickness of the stack after compacting during the polymerization phase, at least one of the longitudinal and transverse dimensions of each ply is longer than that of the part to be produced in order to receive these terminals.

After the pre-impregnated fiber plies 12 and the metal foils 13 are deposited, the assembly is covered with, among other items, a bladder 15 allowing the hermetic passage of electrical connection elements 16 of the power supply circuit such as electrical wires.

Moreover, the placing of the stack under pressure during the polymerization step is provided by a pressing means (not represented). This pressing means can for example comprise one or more strips moving along vertical guiding rails.

A rise in the temperature of the material is provided through the Joule effect, with a heat source placed directly at the core of the material to be polymerized, thereby advantageously limiting the energy required for the polymerization of the part for the same polymerization efficiency.

By using one or more temperature probes (not represented) introduced in the assembly thus obtained, for example directly in the material to be polymerized, the electrical power delivered by the power supply source 14 can be controlled according to the required temperature profile.

Advantageously, for cases of low-thickness parts or of low reaction exotherm material, the speeds of temperature rise will no longer be limited by the thermal inertias of the tools and the prior-art heating means.

Once the polymerization step is accomplished, the hardened assembly thus obtained is cut out to the final dimensions of the part to be produced, which notably amounts to eliminating the parts of this assembly that have received, or are positioned at, the metal foils 13.

Figure 2:
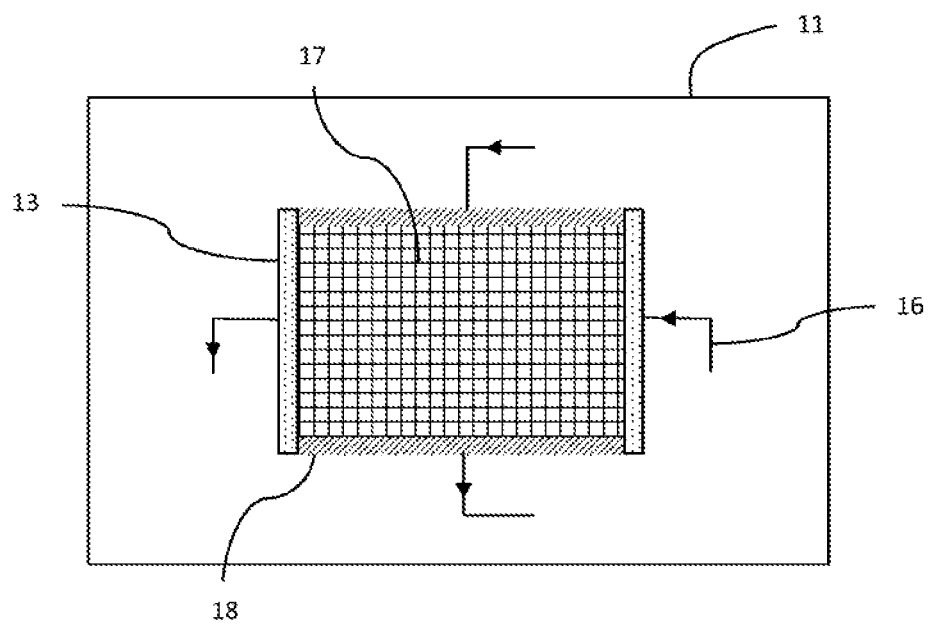
FIG. 2 is a partial view from above of a stack of plies in which electrical terminals have been arranged between all the edges of two successive plies according to another aspect of the process of the disclosed embodiment.

FIG. 2 is a partial view and a view from above of a stack of plies implemented in another aspect of the process of the presently disclosed embodiment. The elements of FIG. 2 bearing the same references as those of FIG. 1 represent the same objects, which will not be described again hereafter.

This stack of plies has been obtained by the deposition of woven plies 17, i.e. plies in each of which the fibers exhibit an orientation of 90° relative to one another. Moreover, electrical terminals 13, 18 are placed between two woven plies 17 on all the sides defined by these two plies.

Of course, and alternatively, first terminals 13 could have been deposited between two first plies 17 at two first opposite edges of these first plies alternating with second terminals 18 placed, for their part, between two second plies 17 at two second opposite edges of these second plies. Preferably, these two first and two second plies have a woven ply 17 in common such that there is a stack of three successive piles.

Thus, a better distribution of energy produced by the Joule effect is ensured in the stack.

What is claimed is:

1. A process for producing a composite material part, in which plies of continuous and electrically conducting fibers are deposited to form a stack of plies on a support, comprising:
    at least a face of said support bearing said stack is electrically insulating, and wherein the following steps are carried out:
    a) introducing an electrical terminal between ends of at least two plies placed one directly above the other in said stack, and on at least two opposite sides of these plies, the electrical terminals being introduced between the plies and on each of the two opposite sides consecutive to deposit of each of the at least two plies,
    b) when said fibers are dry, introducing a resin to impregnate said fibers,
    c) making a current flow between said electrical terminals through said plies in order to harden said resin by Joule heating or to bring said resin to the liquid state by Joule heating with a view to consolidating said resin.

2. The process as claimed in claim 1, wherein since said stack exhibits a longer dimension along at least one of the longitudinal and transverse axis of said part, the hardened assembly obtained at step c) is cut out according to the measurements of the part to be produced.

3. The process a claimed in claim 1, wherein at step a), at least said electrical terminals between the ends of the two plies placed on directly above the other are introduced at the center of said stack in order to heat this stack at the core.

4. The process as claimed in claim 1, wherein at least some of said plies of the stack are deposited such that the fibers of these plies exhibit different orientations relative to a main axis of this stack.

5. The process as claimed in claim 1, wherein at least one temperature sensor is introduced in said stack or at least one temperature sensor is placed on the outer surface of said stack and in that the electrical power is controlled as a function of a required temperature profile.

6. The process as claimed in claim 1, wherein at step b), said plies are impregnated with a thermoset or thermoplastic resin.

7. The process as claimed in claim 1, wherein the impregnation of said resin is performed by vacuum means.

8. The process as claimed in claim 1, wherein said plies of fibers are plies of unidirectional fibers or woven plies.

\* \* \* \* \*